United States Patent [19]
Chiu

[11] Patent Number: 5,672,227
[45] Date of Patent: Sep. 30, 1997

[54] RESIN TRANSFER MOLDING PROCESS FOR MAKING COMPOSITE PIPE

[76] Inventor: Chang-Hsuan Chiu, c/o Hung Hsing Patent Service Center P.O. Box 55-1670, Taipei, Taiwan

[21] Appl. No.: 575,673

[22] Filed: Dec. 18, 1995

[51] Int. Cl.⁶ .............................. B29C 61/02; B32B 1/10; B65H 81/06
[52] U.S. Cl. .......................... 156/295; 156/86; 264/230; 264/257
[58] Field of Search .......................... 156/295, 172, 156/173, 86; 264/230, 257, 258, 313

[56] References Cited

U.S. PATENT DOCUMENTS

| | | | |
|---|---|---|---|
| 5,076,871 | 12/1991 | Frye | 156/86 |
| 5,441,692 | 8/1995 | Taricco | 264/257 |
| 5,474,630 | 12/1995 | Rouillot | 156/149 |

FOREIGN PATENT DOCUMENTS 2089761  6/1982  United Kingdom .

*Primary Examiner*—Daniel Stemmer

[57] ABSTRACT

A resin transfer molding process for making composite pipe. The method includes disposing a preform on a mandrel and jacketing a heat-shrinkable sleeve over the preform such that an annular gap is maintained between the sleeve and the preform to form a buffer chamber in the annular gap. A thermosetting resin is then filled into the buffer chamber. The resin is then leveled and settled in the resin in the buffer chamber to form a resin pool. The heat-shrinkable sleeve is thermally shrunk by heating the sleeve. The heating occurs in a heating zone having an upper portion and a lower portion. A first fastening ring is fastened on the sleeve adjacent to the upper portion of the heating zone, and a second fastening ring is fastened on the sleeve adjacent to the lower portion of the heating zone. The heating zone moves upwardly along the sleeve to thermally shrink the sleeve. The resin is heated and cured and the sleeve is removed to form a composite pipe.

1 Claim, 3 Drawing Sheets

RESIN TRANSFER MOLDING PROCESS FOR MAKING COMPOSITE PIPE

BACKGROUND OF THE INVENTION

U. K. Patent Application GB2089761A by C. K. Hall disclosed a heat shrinking plastic member onto filament and resin composite by winding a resin impregnated glass or carbon filament onto a mandrel to form a prepreg tube and by disposing a heat-shrink sleeving on the tube for making a composite tube after thermally shrinking the sleeving and curing the resin. However, the prepreg tube should be continuously frozen before the heat-shrinking step to prevent its curing, thereby increasing facility and production cost. It is difficult to expel or vent the bubbles as produced in the heat shrinking process to thereby deteriorate the product quality.

U.S. Pat. No. 5,076,871 to Frye et al. disclosed a method for forming composite prepreg articles by utilizing heat-shrinkable braided sleeves, which however requires complex processing steps by encapsulating the assembly composed of the sleeve, the prepreg and the release film and by applying a vacuum for compacting the prepreg material. The prepreg material should also be frozen before its heat shrinking and curing process, increasing facility and production cost accordingly.

It is known that a resin transfer molding process and system may be applied for creating composite materials, such as taught by U.S. Pat. No. 5,441,692 to Todd Taricco, including encapsulating a fibrous sheet within a tool and a cover plate, that together define an inner cavity in which the pressure is then reduced to create a vacuum within the tooling, still requiring a complex tooling system and increasing facility and production cost. Meanwhile, to homogeneously transfer the resin into the fibrous sheet (26) within the inner cavity (30) of the tooling will possibly cause quality control problem since the resin flowing paths in the fibrous sheet are random, irregular and difficultly controlled. Therefore, the resin distribution in the fibrous sheet is not homogeneous, still deteriorating the product quality of the resin transfer molding (RTM) products.

The conventional RTM process for making composite articles may have the drawbacks of unhomogeneous penetration of resin in the fiber sheet, bubbles and porosity existing in the product, and requiring complex and expensive tooling system.

None of the prior arts disclose a method for making composite pipes or tubes by resin transfer molding (RTM) process.

SUMMARY OF THE INVENTION

The object of the present invention is to provide a resin transfer molding process for making composite pipe or tube at a lower equipment and production cost and for a homogeneous resin distribution for better product quality, including the steps of:

1. Disposing a preform made of braided form or other textile forms on a mandrel;
2. Jacketing a heat-shrinkable sleeve over the preform fitted on the mandrel by defining an annular gap between the sleeve and the preform for forming a buffer chamber in the annular gap;
3. Filling a thermosetting resin into the buffer chamber through an inlet port of the buffer chamber, and then sealing the inlet port of the buffer chamber;
4. Thermally shrinking the heat-shrinkable sleeve from a bottom portion of the sleeve towards an upper portion of the sleeve to contract the sleeve to boost the resin in the buffer chamber to flow centripetally and upwardly to homogeneously penetrate the resin into the preform and to forcedly draft the bubbles in the resin and preform upwardly for efficiently venting and removing the bubbles in the composite material; and
5. Heating and curing the resin for hardening the composite material and removing the sleeve for forming the composite pipe or tube.

DETAILED DESCRIPTION

Figure 1:
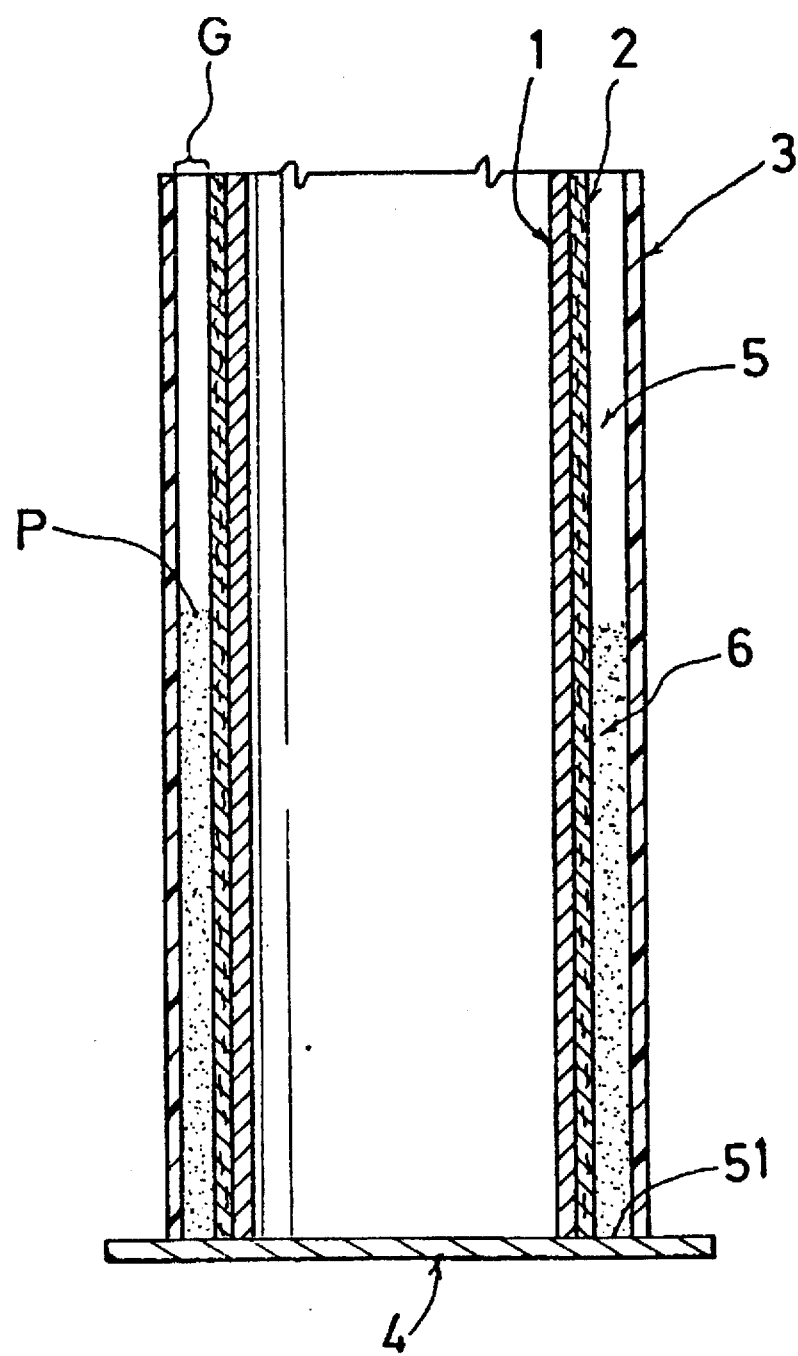
FIG. 1 is a sectional drawing for preparing a composite pipe in accordance with the present invention.

As shown in FIGS. 1–4, a process for making composite pipes or tubes in accordance with the present invention comprises the steps of:

1. Disposing a preform 2 made of braided form or other textile forms on a mandrel 1 as shown in FIG. 1. The mandrel 1 may be made of metal or non-metal materials, and may be shaped as any closed form structures. The preform shapes, configurations, and orientations of filament strands of the preform 2 may be optionally chosen and not limited in this invention. However, a circular cross section of the mandrel 1 and the preform 2 is preferred in this invention.
2. Jacketing a heat-shrinkable sleeve 3 over the preform 2 fitted on the mandrel 1 by defining an annular gap G between the sleeve 3 and the preform 2 for forming a buffer chamber 5 within the preform 2, the sleeve 3 and an end plate 4 when sealing a bottom end of a pipe assembly composed of the mandrel 1, the preform 2 and the sleeve 3. The heat-shrinkable sleeve 3 may be made of polyvinylchloride (PVC) film, strap or sheet, or other materials which are shrinkable under heat exposure. The sleeves 3 may also be plural layers to be used in this invention.
3. Filling a thermosetting resin 6 into the buffer chamber 5 through an inlet port 51 of the buffer chamber 5 and then sealing the inlet port 51 by capping the end plate 4 on the bottom end of the pipe assembly (1, 2, 3), and gravitationally levelling and settling the resin 6 in the buffer chamber 5 to form a "resin pool" P in the buffer chamber 5. The thermosetting resin 6 may be selected from epoxy resin or other thermosettable resins. The resin 6 used in this invention may be 35–50% by weight based on the weight of the fibrous material of the preform 2. The volume content of the fibrous material of the preform 2 is 40–62% by volume based on 100% of the total volume of the composite product as made by the method in accordance with the present invention.

The volume of the buffer chamber 5 is designated as $V_b$ and the volume of the resin 6 filled in the buffer chamber is designated as $V_r$, a formula is then obtained:

$V_b = n \cdot V_r; \ n > 1$ wherein n is larger than 1 so as to provide an enough volume of the buffer chamber for the smooth flow of resin in the chamber 5.

4. Thermally shrinking the heat-shrinkable sleeve 3 by heating the sleeve 3 by a heating means 8 (such as provided at a movable heating zone H as shown in FIG. 2) from a lower position adjacent to the inlet port 51 of the buffer chamber 5 and a bottom portion of the sleeve 3 at a temperature ranging from 75° C. to 90° C. and then progressively heating the middle and upper portions of the sleeve 3 and also conductively heating the resin 6 in the buffer chamber 5.

Figure 2:
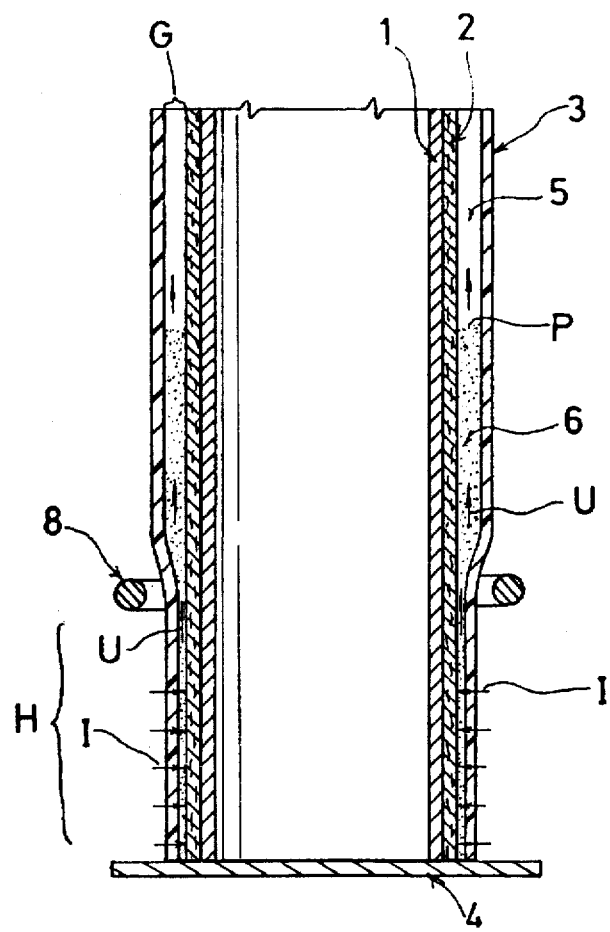
FIG. 2 is an illustration showing a heat shrinking and resin flow step in accordance with the present invention.
Figure 3:
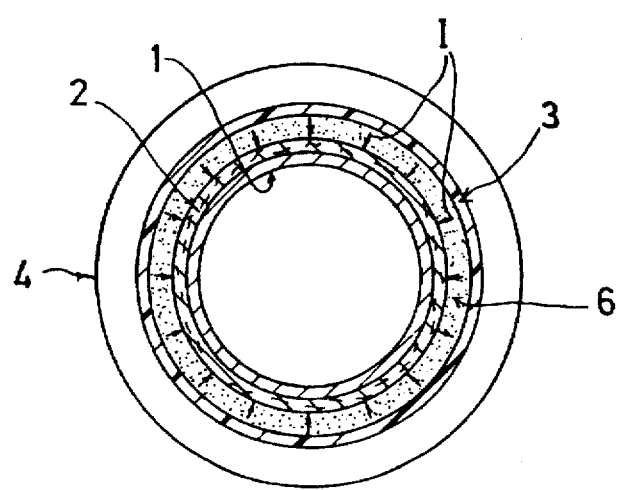
FIG. 3 is a top view of the present invention from FIG. 2.
Figure 4:
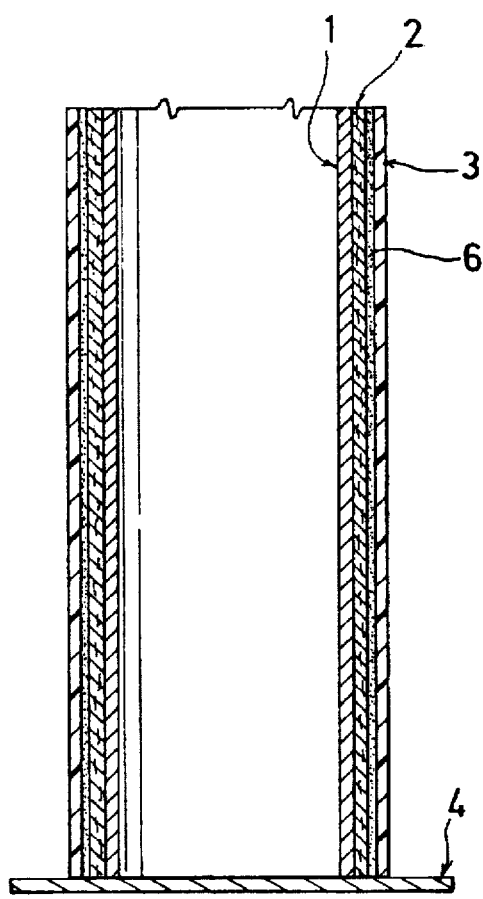
FIG. 4 is a sectional drawing of the composite pipe as made in accordance with the present invention.

During the heating of the sleeve 3, the sleeve is shrunk to boost the resin fluid in the resin pool P to flow centripetally (I) and upwardly (U) as shown in FIGS. 2, 3 to homogeneously penetrate the resin into the fibers or inner structure of the preform 2 to efficiently wet and impregnate the fibers of the preform 2 and to forcedly draft the bubbles existing in the resin and preform upwardly for efficiently venting and removing the bubbles therefrom for decreasing the porosity in a composite pipe product for better quality control of the present invention.

The flow path of the resin 6 as boosted by the heat-shrunk sleeve 3 is centripetal I and upward U, and the resin flow is regular and homogeneous in comparison with the irregular, random and unhomogeneous resin flow and distribution of the conventional RTM processes.

The heating process in the buffer chamber 5 of the present invention is conducted at the system pressure as spontaneously boosted by the inherent pressure of the heat shrunk sleeve 3 under heating, without increasing the system pressure by other external pumping or boosting means.

Even though the heat shrinking process of the present invention can be conducted at the system pressure as aforementioned. If the buffer chamber 5 is well sealed and decreased in pressure to form a vacuum, the air bubbles in the resin and preform will then be sucked and removed more efficiently. However, the vacuum pressure system is not absolutely necessary in this invention.

The composite pipe of the present invention is preferably vertically erected as shown in the drawing figures accompanying herewith. However, an inclined pipe or other orientations of the pipe may also be modified in accordance with the present invention.

5. Continuously heating and curing the resin at a hardening temperature of the resin such as 120° C. to 180° C. for epoxy resin for hardening the resin impregnated preform disposed on the mandrel and then removing the sleeve for forming a composite pipe.

After curing the resin, the preform as disposed on the mandrel and homogeneously impregnated with resin will be bonded to form a consolidated structure for obtaining a reinforced composite pipe.

The above-mentioned steps are provided for making composite pipe having thin layer of the preform 2.

Figure 5:
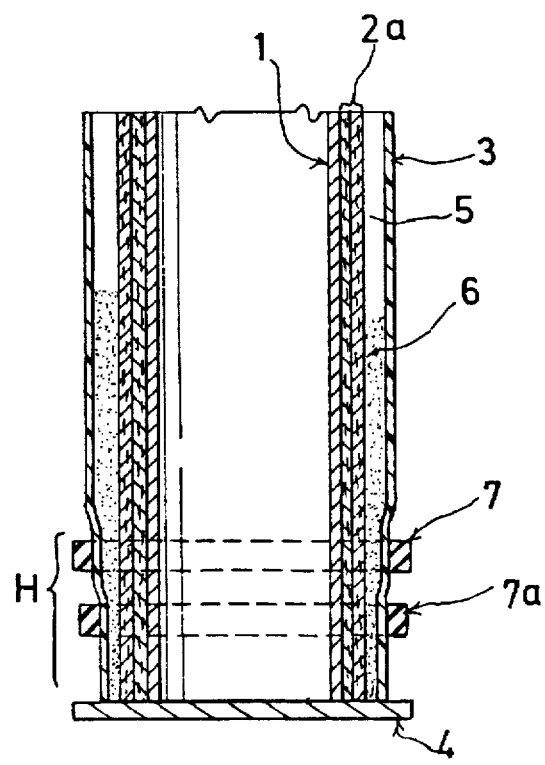
FIG. 5 shows another preferred embodiment of the present invention.

If the preform 2 is formed as thicker layer or with multiple layers 2a of fibrous material as shown in FIG. 5, a first fastening ring 7 is provided to fasten the sleeve 3 at an upper position of a heating zone H when heated for limiting the upward (U) resin flow and for enhancing the centripetal or inward (I) resin flow for a better resin penetration into the preform; and a second fastening ring 7a is provided to fasten the sleeve 3 at a lower position of the heating zone H for sizing or maintaining a constant diameter of the composite pipe.

The present invention is superior to a conventional method for making composite prepreg tubes and also superior to a conventional RTM method for making composite materials with the following advantages:

1. The resin is centripetally (I) penetrated into the preform when thermally shrinking the outer sleeve for homogeneously distributing the resin into the preform for well consolidating the resin with the preform, and the resin is also upwardly (U) driven for an upper resin penetration and for upwardly drafting air bubbles in the resin and preform to eliminate the air and porosity in a composite pipe.

2. There is no cover and tool provided for the molding process for saving tooling and production cost.

3. The preform is not pre-impregnated with resin so that no freezing equipment is required, thereby saving facility cost and simplifying the molding process.

4. The resin is fed into the buffer chamber (5) and driven upwardly from a lower position of the preform and sleeve to an upper position thereof to allow the resin to be gravitationally settled and levelled in the "resin pool" (P) in the buffer chamber 5 within the preform and the sleeve to enhance a homogeneous distribution of the resin into the preform, helpful for a better quality of the composite pipe.

The present invention may be modified without departing from the spirit and scope of this invention. For heat shrinking of the sleeve 3, the heating means 8 may be moved from a lower position to an upper position of the pipe; or the pipe is lowered in relation to the heating means 8. Other resin filling directions or heating directions may also be modified in accordance with the present invention. The mandrel 1 may be removed or may not be removed from the preform 2 once bonded with resin 6 when finishing the process of this invention, depending upon the practical requirement of the composite pipe product.

I claim:

1. A resin transfer molding process for making composite pipe comprising the steps of:

a. disposing a preform on a mandrel;

b. jacketing a heat-shrinkable sleeve over the preform disposed on the mandrel wherein an annular gap is maintained between the sleeve and the preform to form a buffer chamber in the annular gap;

c. filling a thermosetting resin into the buffer chamber through an inlet port of the buffer chamber, then sealing the inlet port and gravitationally levelling and settling the resin in the buffer chamber to form a resin pool in the buffer chamber;

d. thermally shrinking the heat-shrinkable sleeve by heating the sleeve with a heating means, said heating occurring in a heating zone comprising an upper portion and a lower portion, said heating zone movable from a lower portion of the sleeve adjacent to the inlet port of the buffer chamber towards an upper portion of the sleeve, whereby upon heating of the sleeve, the sleeve is shrunk to boost the resin in the resin pool to flow centripetally and upwardly to homogeneously penetrate the resin into the preform to impregnate the preform and to force bubbles existing in the resin and preform upwardly to vent and remove the bubbles therefrom; and e. heating and curing the resin at a hardening temperature of the resin to harden the resin impregnated preform disposed on the mandrel and then removing the sleeve to form a composite pipe; wherein the step of thermally shrinking the heat-shrinkable sleeve includes providing a first fastening ring fastened on said sleeve adjacent to the upper portion of said heating zone to limit an upward resin flow and to enhance centripetal resin flow, and providing a second fastening ring fastened on said sleeve adjacent to the lower portion of the heating zone for keeping a constant diameter of the pipe, said heating zone and said heating means moving upwardly along said sleeve to thermally shrink said sleeve.

* * * * *